United States Patent
Corner et al.

(10) Patent No.: US 9,996,827 B2
(45) Date of Patent: *Jun. 12, 2018

(54) SYSTEM AND METHOD FOR METERED PARKING AT A PARKING SERVER

(71) Applicant: BOKU, INC., San Francisco, CA (US)

(72) Inventors: Katherine Ann Corner, San Francisco, CA (US); Wellington W. Sculley, San Francisco, CA (US); Oliver J. McCarthy-Foecke, San Francisco, CA (US); Chia-ling Sung, San Francisco, CA (US); John Ly, San Francisco, CA (US); Samantha Elena Nebrich, San Francisco, CA (US)

(73) Assignee: Boku, Inc., San Francisco, CA (US)

( * ) Notice: Subject to any disclaimer, the term of this patent is extended or adjusted under 35 U.S.C. 154(b) by 764 days.

This patent is subject to a terminal disclaimer.

(21) Appl. No.: 14/022,592

(22) Filed: Sep. 10, 2013

(65) Prior Publication Data

US 2015/0073881 A1 Mar. 12, 2015

(51) Int. Cl.
*G07B 15/00* (2011.01)
*G06Q 20/14* (2012.01)
*G06Q 20/32* (2012.01)
*G07B 15/02* (2011.01)

(52) U.S. Cl.
CPC ....... *G06Q 20/145* (2013.01); *G06Q 20/3221* (2013.01); *G07B 15/02* (2013.01)

(58) Field of Classification Search
CPC ....... G06Q 20/32; G06Q 20/322; G07B 15/02
USPC .......................................................... 705/13
See application file for complete search history.

(56) References Cited

U.S. PATENT DOCUMENTS

| 5,835,856 | A | 11/1998 | Patesh Mahesh |
| 7,079,524 | B2 | 7/2006 | Bantukul et al. |
| 7,437,331 | B1 * | 10/2008 | Rosenberger ......... G06Q 20/04 705/35 |
| 7,647,278 | B1 | 1/2010 | Foth et al. |
| 7,870,077 | B2 | 1/2011 | Woo et al. |
| 8,744,971 | B2 | 6/2014 | Chen et al. |
| 8,825,532 | B1 | 9/2014 | Wong |

(Continued)

FOREIGN PATENT DOCUMENTS

GB  2437176 A  * 10/2007 ............. G06Q 20/00

OTHER PUBLICATIONS www.gulfnews.com, "RTA to allow parking fees to be paid via SMS service," published on May 3, 2009, pp. 1-3. (Year: 2009).*

(Continued)

*Primary Examiner* — Brian M Epstein
(74) *Attorney, Agent, or Firm* — Stephen M. De Klerk (57) ABSTRACT

A parking request text message is transmitted from a user mobile phone to a billing server and is forwarded to a parking server. The parking server makes a charge API call to the billing server, including a custom text, an amount to be billed and a msisdn of the mobile phone. The billing server charges an account at a carrier server corresponding to the msisdn, receives a charge confirmation from the carrier server, transmits a billing result to the parking server, and sends a confirmation text message to the user mobile phone with the custom text. The parking server updates a parking data structure to indicate that parking has been allotted based on a parking identification in the parking request text message.

13 Claims, 7 Drawing Sheets

(56) References Cited

U.S. PATENT DOCUMENTS

| | | | |
|---|---|---|---|
| 9,003,078 B2 | 4/2015 | Browne et al. | |
| 2001/0056354 A1 | 12/2001 | Feit et al. | |
| 2002/0032601 A1* | 3/2002 | Admasu | G06Q 30/04 705/13 |
| 2004/0039632 A1* | 2/2004 | Han | G06Q 20/32 705/13 |
| 2004/0143523 A1 | 7/2004 | Pegaz-Paquet et al. | |
| 2004/0203943 A1 | 10/2004 | Cai et al. | |
| 2004/0267663 A1 | 12/2004 | Karns et al. | |
| 2006/0116892 A1* | 6/2006 | Grimes | G06Q 10/02 705/5 |
| 2006/0218091 A1 | 9/2006 | Choy | |
| 2006/0259354 A1* | 11/2006 | Yan | G06Q 20/127 705/13 |
| 2006/0281492 A1 | 12/2006 | Jiang | |
| 2007/0054678 A1 | 3/2007 | Doulton | |
| 2007/0077921 A1 | 4/2007 | Hayashi et al. | |
| 2007/0220565 A1 | 9/2007 | Angel et al. | |
| 2007/0287413 A1 | 12/2007 | Kleitsch et al. | |
| 2008/0101370 A1 | 5/2008 | Marisco et al. | |
| 2008/0319823 A1 | 12/2008 | Ahn et al. | |
| 2009/0043642 A1 | 2/2009 | Block et al. | |
| 2009/0081989 A1 | 3/2009 | Wuhrer | |
| 2009/0089116 A1 | 4/2009 | Quirk et al. | |
| 2010/0030708 A1* | 2/2010 | Ward, II | G06Q 20/127 705/418 |
| 2010/0235276 A1* | 9/2010 | Smith | G06Q 20/04 705/40 |
| 2010/0268618 A1* | 10/2010 | McQuilken | G06Q 20/32 705/26.1 |
| 2010/0274693 A1* | 10/2010 | Bause | G06Q 20/32 705/32 |
| 2011/0217994 A1* | 9/2011 | Hirson | G06Q 20/12 455/466 |
| 2011/0238545 A1 | 9/2011 | Fanaian et al. | |
| 2012/0078751 A1* | 3/2012 | MacPhail | G06Q 20/06 705/26.41 |
| 2012/0130777 A1* | 5/2012 | Kaufman | G07B 15/02 705/13 |
| 2012/0173348 A1* | 7/2012 | Yoo | G06O 20/10 705/16 |
| 2012/0173410 A1* | 7/2012 | Gillin | G06Q 20/10 705/39 |
| 2012/0191600 A1* | 7/2012 | Boot | B60L 11/1848 705/40 |
| 2012/0231876 A1* | 9/2012 | de Cuba | G07F 17/3223 463/25 |
| 2012/0232965 A1 | 9/2012 | Rodriquez et al. | |
| 2012/0296708 A1* | 11/2012 | Bachmann | G06Q 20/127 705/13 |
| 2013/0117079 A1* | 5/2013 | Ioli | G06Q 20/40 705/13 |
| 2013/0138558 A1* | 5/2013 | Rannu | G06Q 20/322 705/39 |
| 2013/0144706 A1 | 6/2013 | Qawami et al. | |
| 2013/0179344 A1* | 7/2013 | Georgoulas | G06Q 20/32 705/44 |
| 2013/0204745 A1* | 8/2013 | Martin | G06Q 30/06 705/26.41 |
| 2013/0217361 A1 | 8/2013 | Mohammed et al. | |
| 2013/0273882 A1* | 10/2013 | Walsh | H04W 4/26 455/407 |
| 2013/0282589 A1 | 10/2013 | Shoup et al. | |
| 2014/0172520 A1 | 6/2014 | Neyaroff et al. | |
| 2014/0228014 A1 | 8/2014 | Tervo et al. | |
| 2014/0235197 A1* | 8/2014 | Corner | H04W 4/14 455/406 |
| 2014/0279455 A1 | 9/2014 | Browne et al. | |
| 2014/0279456 A1 | 9/2014 | Browne et al. | |
| 2014/0289036 A1 | 9/2014 | Aurigemma | |
| 2014/0379441 A1* | 12/2014 | Avendano | G07F 17/24 705/13 |
| 2015/0006372 A1 | 1/2015 | Browne et al. | |
| 2015/0006381 A1 | 1/2015 | Browne et al. | |
| 2015/0052049 A1* | 2/2015 | Kim | G06Q 20/102 705/41 |
| 2015/0058221 A1 | 2/2015 | Corner et al. | |
| 2015/0127503 A1 | 5/2015 | Steif et al. | |
| 2015/0127532 A1 | 5/2015 | Steif et al. | |
| 2015/0178640 A1* | 6/2015 | Balakrishnan | G06Q 50/30 705/13 |

OTHER PUBLICATIONS

Non Final Office Action dated Mar. 26, 2018, U.S. Appl. No. 14/022,561, (17 pages).

* cited by examiner

SYSTEM AND METHOD FOR METERED PARKING AT A PARKING SERVER

BACKGROUND OF THE INVENTION

1). Field of the Invention

This invention relates to a metered parking system and its method of use.

2). Discussion of Related Art

Various metered parking systems exist in the art. A parking provider may for example have meter units at parking spaces and a user may pay at the respective meter unit using cash or a credit card. Alternatively, a parking lot may have a central kiosk where a user can purchase parking time for display on a dashboard of their vehicle.

A parking provider often controls parking by providing a mobile parking unit that an attendant can use remotely from a server to determine whether parking has been paid for by a respective vehicle or for a particular parking location. This allows the attendant to determine whether a ticket or a fine should be issued.

Paying by cash can be cumbersome because a user may not have the exact change to enter into a meter unit or kiosk. Credit cards are also restrictive in that many people do not own credit cards. When paying by cash or credit card it is also necessary to interact with a particular meter unit or kiosk, which does not allow for a user to increase their parking time when away from the meter unit or kiosk.

SUMMARY OF THE INVENTION

The invention provides a method of processing a payment for parking with a parking server including receiving, at the parking server, a parking request message that originated from a user mobile phone having a Mobile Subscriber Integrated Services Digital Network-Number (msisdn), the parking request text message including a parking identification, transmitting, with the parking server, a charge Application Programmable Interface (API) call to a billing server in response to the parking request text message, the charge API call including a custom text, an amount to be billed and the msisdn, the billing server to charge an account at the carrier server corresponding to the msisdn for an amount that is based on the amount in the charge API call, receiving, at the parking server, a billing result from the billing server indicating that the account has been charged, updating, with the parking server, a parking data structure to indicate that parking has been allotted based on the parking identification, recording, with the parking server, a start time stamp for the allotment of the parking based on the parking identification, the start time stamp being a clock time from a clock indicating when the parking based on the parking identification is allotted, calculating, with the parking server, an expiration time stamp, the expiration time stamp being the starting time stamp plus a predetermined amount of time and canceling, with the parking server, the allotment of the parking based on the parking identification when a clock time from a clock reaches a time that is greater than the expiration time stamp.

The invention also provides a non-transitory computer-readable medium having a set of instructions thereon that are executable by a processor of a computer to carry out a method of processing a payment for parking with a parking server including receiving, at the parking server, a parking request text message from a user mobile phone, the parking request text message including a parking identification, identify, with the parking server, a Mobile Subscriber Integrated Services Digital Network-Number (msisdn) from the parking request text message, transmitting, with the parking server, a charge Application Programmable Interface (API) call to a billing server in response to the parking request text message, the charge API call including an amount to be billed and the msisdn, the billing server to charge an account at the carrier server corresponding to the msisdn for an amount that is based on the amount in the charge API call, receive, at the parking server, a billing result from the billing server indicating that the account has been charged, updating, with the parking server, a parking data structure to indicate that parking has been allotted based on the parking identification, recording, with the parking server, a start time stamp for the allotment of the parking based on the parking identification, the start time stamp being a clock time from a clock indicating when the parking based on the parking identification is allotted, calculating, with the parking server, an expiration time stamp, the expiration time stamp being the starting time stamp plus a predetermined amount of time and canceling, with the parking server, the allotment of the parking based on the parking identification when a clock time from a clock reaches a time that is greater than the expiration time stamp.

The invention further provides a metered parking system for processing a payment for parking including a parking server including a processor, a computer-readable medium connected to the processor and a set of instructions on the computer-readable medium, the set of instructions being executable by the processor. The set of instructions includes a parking code processor receiving a parking request text message from a user mobile phone having a Mobile Subscriber Integrated Services Digital Network-Number (msisdn), the parking request text message including a parking identification, a merchant server charge method Application Programmable Interface (API) that transmits a charge API call to a billing server in response to the parking request text message, the charge API call including a custom text, an amount to be billed and the msisdn, the billing server to charge an account at the carrier server corresponding to the msisdn for an amount that is based on the amount in the charge API call, and the billing server to transmit a parking confirmation text message to the user mobile phone at the msisdn, the parking confirmation text message including the custom text, wherein the merchant server charge method API receives a billing result from the billing server indicating that the account has been charged, a parking time management module updating a parking data structure to indicate that parking has been allotted based on the parking identification, wherein the parking time management module records a start time stamp for the allotment of the parking based on the parking identification, the start time stamp being a clock time from a clock indicating when the parking based on the parking identification is allotted, wherein the parking time management module calculates an expiration time stamp, the expiration time stamp being the starting time stamp plus a predetermined amount of time, and wherein the parking time management module cancels the allotment of the parking based on the parking identification when a clock time from a clock reaches a time that is greater than the expiration time stamp.

BRIEF DESCRIPTION OF THE DRAWINGS

The invention is described by way of example with reference to the accompanying drawings, wherein.

DETAILED DESCRIPTION OF THE INVENTION

Figure 1:
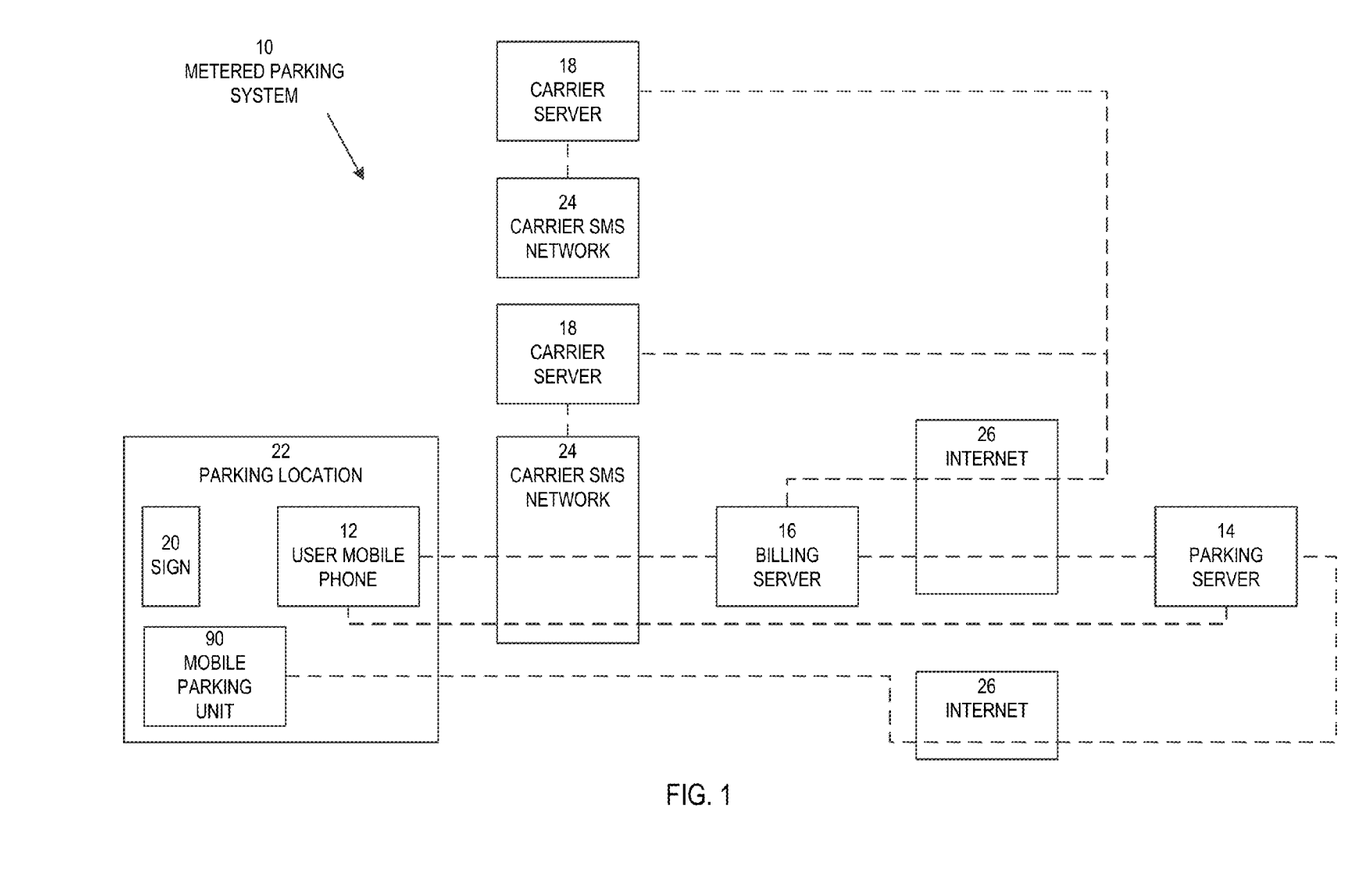
FIG. 1 is a block diagram of a metered parking system according to an embodiment of the invention.

FIG. 1 of the accompanying drawings illustrates a metered parking system 10, according to an embodiment of the invention that includes a user mobile phone 12, a parking server 14, a billing server 16, a plurality of carrier servers 18 and a sign 20 at a parking location 22.

A plurality of carrier Short Message Service (SMS) networks 24 are provided. The user mobile phone 12 is connected over one of the carrier SMS networks 24 to the parking server 14 and the billing server 16. The relevant carrier SMS network 24 belongs to the same carrier as one of the carrier servers 18. The relevant carrier server 18 monitors traffic over the relevant carrier SMS network 24. SMS text messages traveling through the carrier SMS network 24 can be augmented by the carrier server 18 with an identification of the respective carrier server 18. The billing server 14 can identify the respective carrier server 18 from the carrier identifier in the text message.

The billing server 16 is connected over the Internet 26 to the parking server 14 and to the carrier servers 18.

Figure 2:
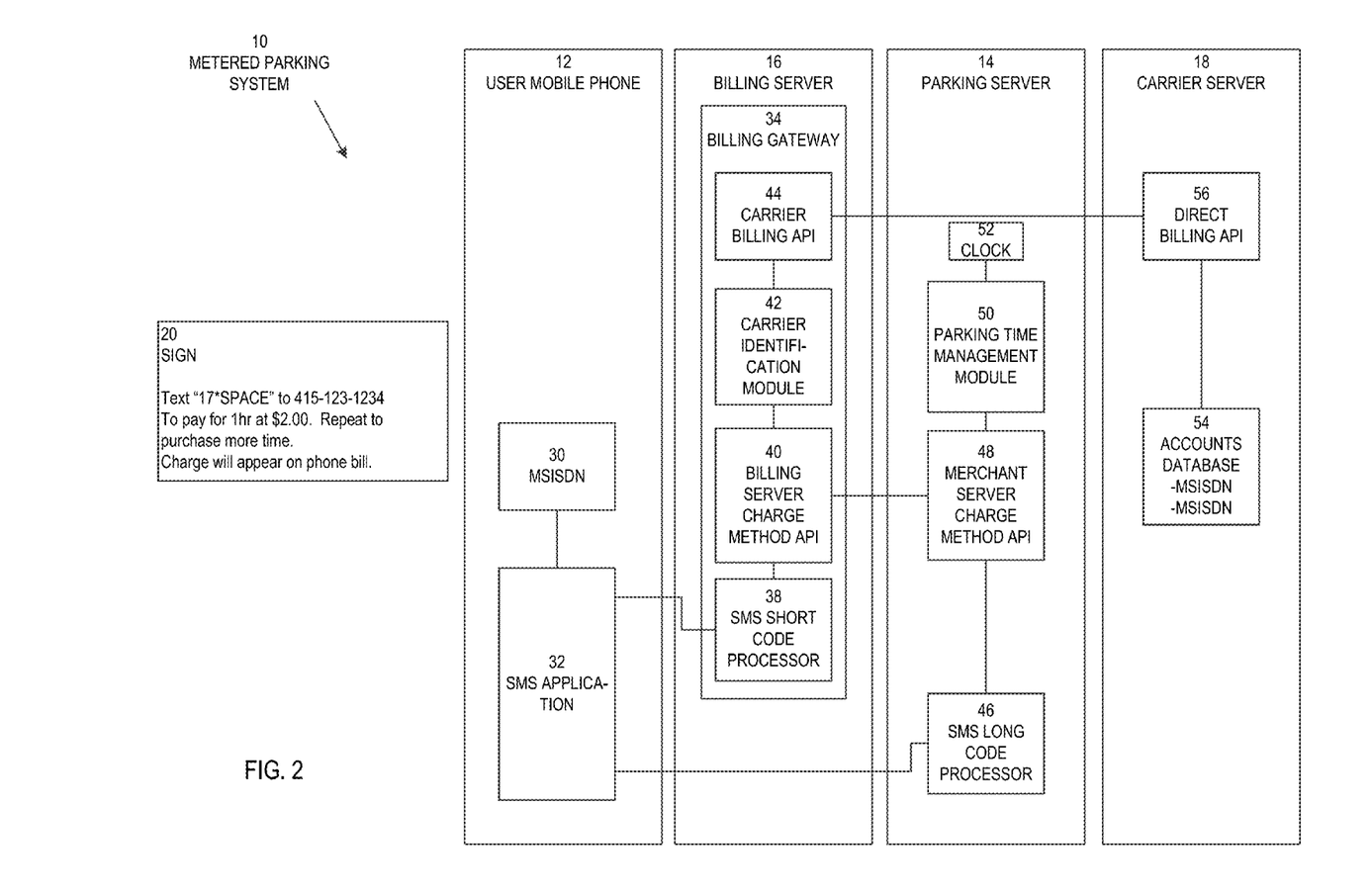
FIG. 2 is a block diagram of components of the metered parking system.

FIG. 2 shows components of the metered parking system 10 in more detail. The user mobile phone 12 includes a Mobile Subscriber Integrated Services Digital Network-Number (msisdn) 30 and an SMS application 32. The msisdn 30 is unique so that the user mobile phone 12 can be reached for purposes of voice communication or for receiving SMS text messages in the SMS application 32. The SMS application 32 is also capable of transmitting SMS text messages. When an SMS text message is transmitted by the SMS application 32 the msisdn 30 is attached to the SMS text message.

The billing server 16 includes a billing gateway 34. The billing gateway 34 has an SMS short code processor 38, a billing server charge method Application Programmable Interface (API) 40, a carrier identification module 42, and a carrier billing API 44. The SMS short code processor 38 is connected over the carrier SMS network 24 in FIG. 1 to the user mobile phone 12. The SMS short code processor 38, billing server charge method API 40, carrier identification module 42 and carrier billing API 44 are connected to one another and share data and data structures with one another.

The parking server 14 includes an SMS long code processor 46, a merchant server charge method API 48, parking time management module 50 and a clock 52. The SMS long code processor 46 is connected over the carrier SMS network 24 in FIG. 1 to the user mobile phone 12. The merchant server charge method API 48 is connected to the parking code processor 46. The merchant server charge method API 48 is also connected over the Internet 26 to the billing server charge method API 40 of the billing server 16. The parking time management module 50 is connected to the merchant server charge method API 48 and the clock 52 of the parking server 14.

The carrier server 18 has an accounts database 54. The accounts database 54 holds a plurality of accounts, each account being identified by a respective msisdn. In the present example the carrier server 18 has a direct billing API 56 that is connected over the Internet 26 in FIG. 1 to the carrier billing API 44. Depending on the particular carrier server 18 in FIG. 1, the carrier server 18 may or may not have a direct billing API 56. A carrier server 18 may for example bill a database using premium SMS (PSMS) text messages instead of using direct billing.

The sign 20 includes a parking identification in the form of "17*SPACE" that represents a particular parking space that a user of the user mobile phone 12 wishes to occupy. The sign 20 includes instructions to text the parking identification to a long code "415-123-1234." In another example, the parking identification may be a zone number, a space number, a license plate number or a combination thereof. The sign 20 also states that a particular time interval will be purchased for a particular amount, in the present example one hour (1 hr) and $2.00, respectively. In another example, the sign 20 may display other time intervals, for example a garage day pass, a 24 hour time period, etc.

Figure 3:
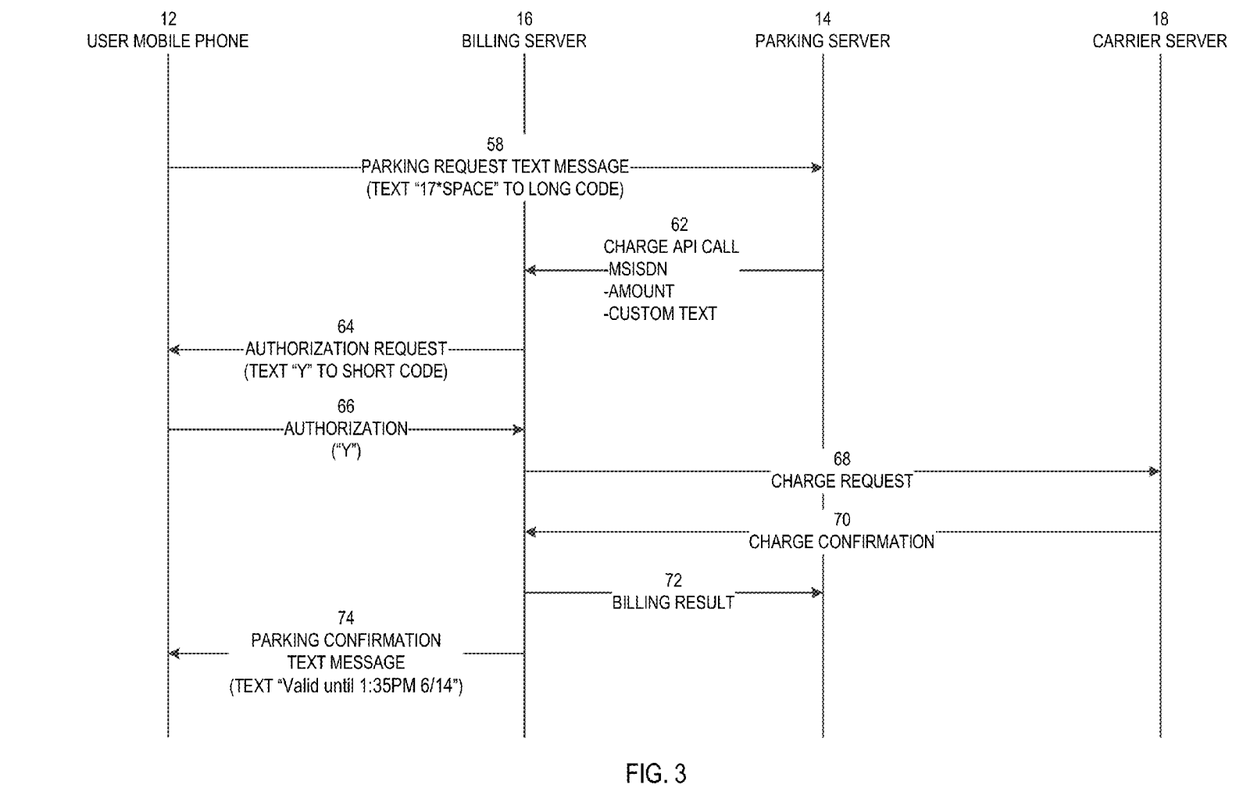
FIG. 3 is an interactive diagram illustrating the functioning of the metered parking system.

FIG. 3 illustrates the functioning of the metered parking system 10 in FIGS. 1 and 2 in more detail. At 58, a user of the user mobile phone 12 is typically located at the parking location 22 in FIG. 1 and sends a parking request text message to the parking server 14. In the present example the user texts "17*SPACE" to the long code on the sign 20 in FIG. 2. The parking request text message is sent with the SMS application 32 of the user mobile phone 12 and includes the msisdn 30 of the user mobile phone 12.

The parking request text message 58 is received with the SMS long code processor 66 of the parking server 14. The long code in the parking request text message 58 is used by the parking server 14 to identify the particular parking location 22 in FIG. 1 when a number of parking locations are under the management of the parking server 14. Parking request text message 58 also includes the msisdn associated with the user mobile phone 12. The parking code processor 46 of the parking server 14 thus receives the parking identifier, the long code and the msisdn.

At 62, the parking server 14 invokes the merchant server charge method API 48 to make a charge API call to the billing server charge method API 40 of the billing server 16. The charge API call 62 includes the msisdn, an amount and a custom text. The custom text is generated by the parking time management module 50. For example, if the message is forwarded at 60 at a time 12:35 pm on Jun. 14, 2013, then the parking time management module 50 calculates an expiration time that is equal to the time that the message is forwarded at 60 plus the time that is indicated on the sign 20. The expiration time will thus be 1:35 pm on Jun. 14, 2013. The custom text will then include "You paid $2.00 for 1 hr parking, zone 17 with Mobile Parking Co. Valid until 1:35 PM 6/14."

The charge API call transmitted at 62 is made to a dedicated Uniform Resource Locator (URL) of the billing server 16.

At 64, the billing server 16 invokes the SMS short code processor 38 to transmit an authorization request to the user mobile phone 12. The authorization request may for example indicate that the user of the user mobile phone 12 should send a reply text with "Y" to a short code of the billing server 16.

At 66, the user enters "Y" and using the SMS application 32 transmits an authorization text message with the authorization "Y" to the billing server 16. The short code processor 38 of the billing server 16 receives the authorization text message and invokes the carrier identification module 42 and the carrier billing API 44. The carrier identification module 42 identifies a select carrier among the carrier servers 18 in FIG. 1 based on the msisdn 30. The carrier billing API 44 at 68 transmits a charge request to the selected carrier server 18.

The direct billing API 56 of the carrier server 18 receives the charge request transmitted at 68 and attempts to charge an account corresponding to the msisdn 30 of the user mobile phone 12. If the carrier server 18 is successful in charging the respective account in the account database 54, then the direct billing API 56 at 70 returns a charge confirmation to the billing server 16. Only if the billing server 16 receives the charge confirmation 70 does the billing server 16 at 72 transmit a billing result to the parking server 14 and at 74 transmit a parking confirmation text message to the user mobile phone 12.

Table 1 shows request parameters for the charge API call at 62 in FIG. 3 and Table 2 shows response parameters for the billing result 72 in FIG. 3.

TABLE 1

| Parameter | Type | Description | Required |
|---|---|---|---|
| msisdn | String | Subscriber phone number. In international msisdn format: country code + phone number, numeric only. | Yes |
| merchant-id | String | Billing server assigned merchant ID. | Yes |
| consumer-id | String | Merchant server provided unique consumer identifier. | No |
| consumer-ip-address | String | IP address of the originating consumer; user for risk checks. If it cannot be obtained submit 'NOT_AVAILABLE'. | Yes |
| service-id | String | Merchant offering ID. | Yes |
| end-merchant-id | String | Boku assigned merchant ID for an end merchant submitting transactions through a reseller. | Yes (if reseller) |
| country | String | Country code in ISO 3166-1-alpha-2 standard. | Yes |
| currency | String | ISO 4217 3 letter currency code. | Yes |
| tax-amount | Number | Tax amount. | Yes |
| total-amount | Number | Total amount including tax. The amount to authorize. (Value is in fractional units). | Yes |
| mnc | String | Mobile network code (MNC). | No |
| mcc | String | Mobile country code (MCC). | No |
| request-id | String | Merchant server assigned request ID. Must be unique. | Yes |
| external-id | String | External ID supplied by calling system. | No |
| external-item-id | String | Merchant assigned identifier for the purchased item. | No |
| external-data | String | Merchant supplied meta data. | No |
| item-description | String | Description of the item being purchased. | Yes |

TABLE 2

| Parameter | Type | Description | Required |
|---|---|---|---|
| charge-id | String | Billing server assigned charge ID (if the call is accepted). | Yes |
| result-code | String | The result of this request. | Yes |
| request-id | String | Merchant server assigned request ID. Must be unique. | Yes |
| result-message | String | Description of the result. | Yes |
| consumer-auth-required | Boolean | If 'TRUE', consumer will receive a text message on their handset requesting a keyword reply or entry of a PIN. | Yes |
| consumer-auth-type | Enum | PIN, KEYWORD. | No |
| consumer-auth-short-code | String | Short code that consumer must send the keyword to. Merchant server can display to user. | Yes (if KEYWORD) |
| consumer-auth-keyword | String | Keyword that consumer must send to short code. Merchant server can display to user. | Yes (if KEYWORD) |

TABLE 2-continued

| Parameter | Type | Description | Required |
|---|---|---|---|
| retry-delay | Number | Returned when a retriable error has occurred. Specifies the minimum time the merchant server should wait before retrying the request. | No |

Figure 4:
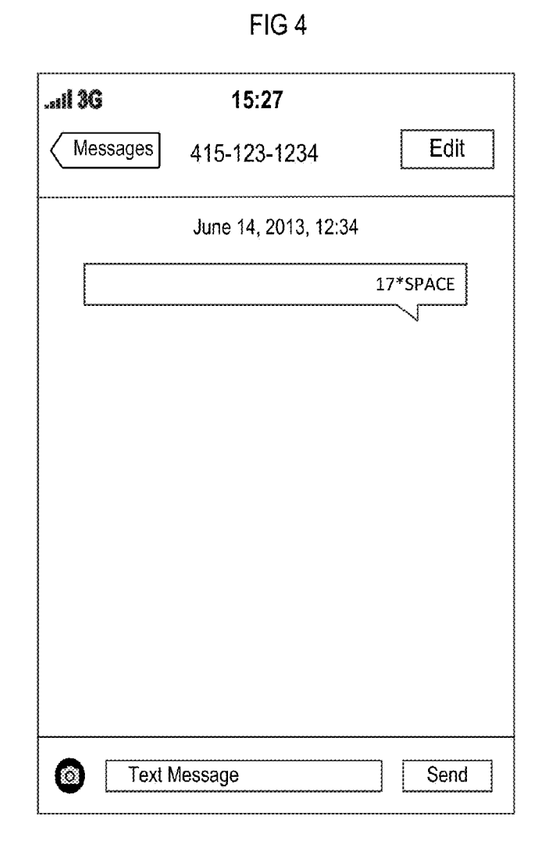
FIG. 4 is a screenshot of a user mobile phone when using a Short Message Service (SMS) application to transmit a parking request text message.
Figure 5:
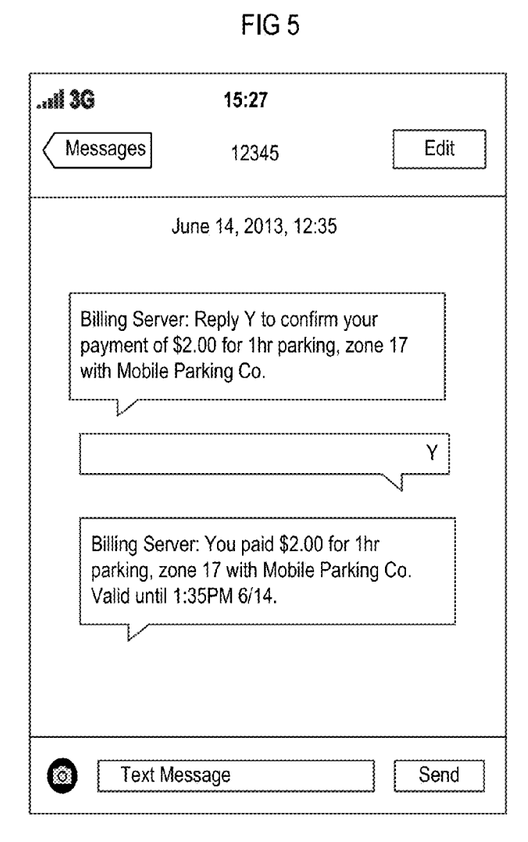
FIG. 5 is a view similar to FIG. 4 illustrating further text messages that are sent and received.

The parking confirmation text message 74 includes the custom text received at 62. In the present example the parking confirmation text message 74 includes the text "Valid until 1:35 PM 6/14." FIG. 4 illustrates the text message that is transmitted at 60 in FIG. 3. The text message includes the parking identification and is sent to the long code of the billing server 16. FIG. 5 illustrates the text messages that are sent and received at 64, 66 and 74 in FIG. 3. The text messages shown in FIG. 5 are sent and received to and from a short code of the billing server 16.

Figure 6:
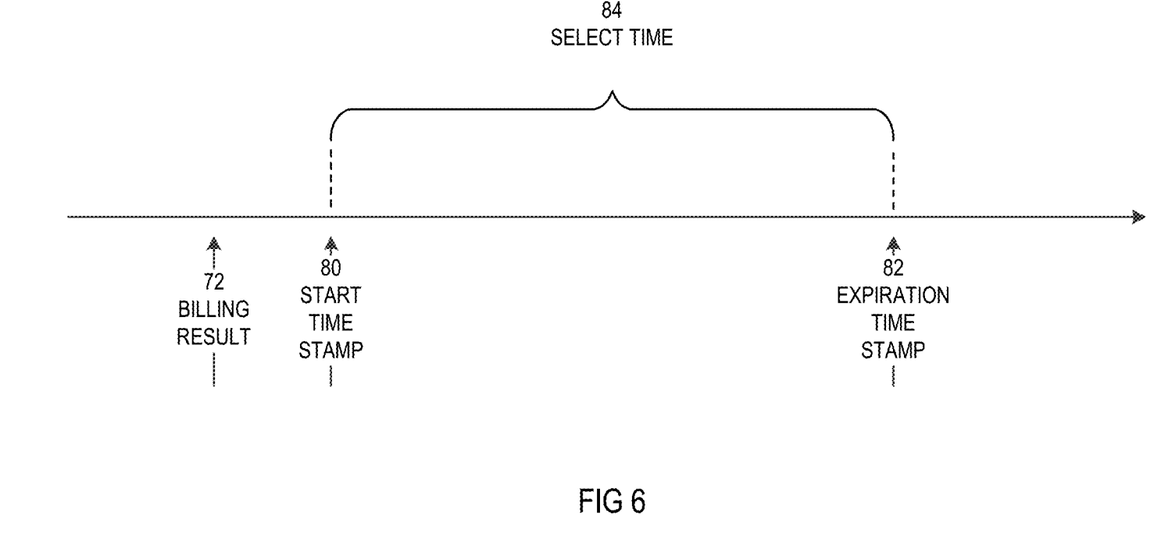
FIG. 6 is time chart illustrating how parking time is controlled by a parking server forming part of the metered parking system.

FIG. 6 illustrates how the parking time management module 50 in FIG. 2 calculates parking time for the particular space selected by the user within the parking location 22 in FIG. 1. At 72, the parking time management module 50 receives the billing result from the billing server 16. Immediately upon receiving the billing result the parking time management module reads the clock 52 and creates and records a start time stamp 80, thus updating a parking data structure to indicate that parking has been allotted based on the parking identification. The start time stamp 80 may for example be 12:36 PM on Jun. 14, 2013, i.e. one minute after the parking request text message is transmitted at 58 in FIG. 3. The parking management module 50 then calculates an expiration time stamp 82. The expiration time stamp 82 equals the starting time stamp 80 plus a select time 84, in the present example 60 minutes. The expiration time stamp 82 will thus be 1:36 PM on Jun. 14, 2013. When the clock 52 reaches the time of the expiration time stamp 82 the allotment of the parking is cancelled. The data structure will thus represent that parking based on the parking identification is cancelled if the time on the clock 52 is greater than the expiration time stamp 82.

As further shown in FIG. 1, the metered parking system 10 includes a mobile parking unit 90 that is wirelessly connected over the Internet 26 to the parking server 14. A parking attendant uses the mobile parking unit 90 to control parking within the parking location 22. The mobile parking unit 90 receives data from the parking time management module 50 in FIG. 2. In the present example, the mobile parking unit 90 will display that space 17 has been paid for between 12:36 PM and 1:36 PM on Jun. 14, 2013.

Figure 7:
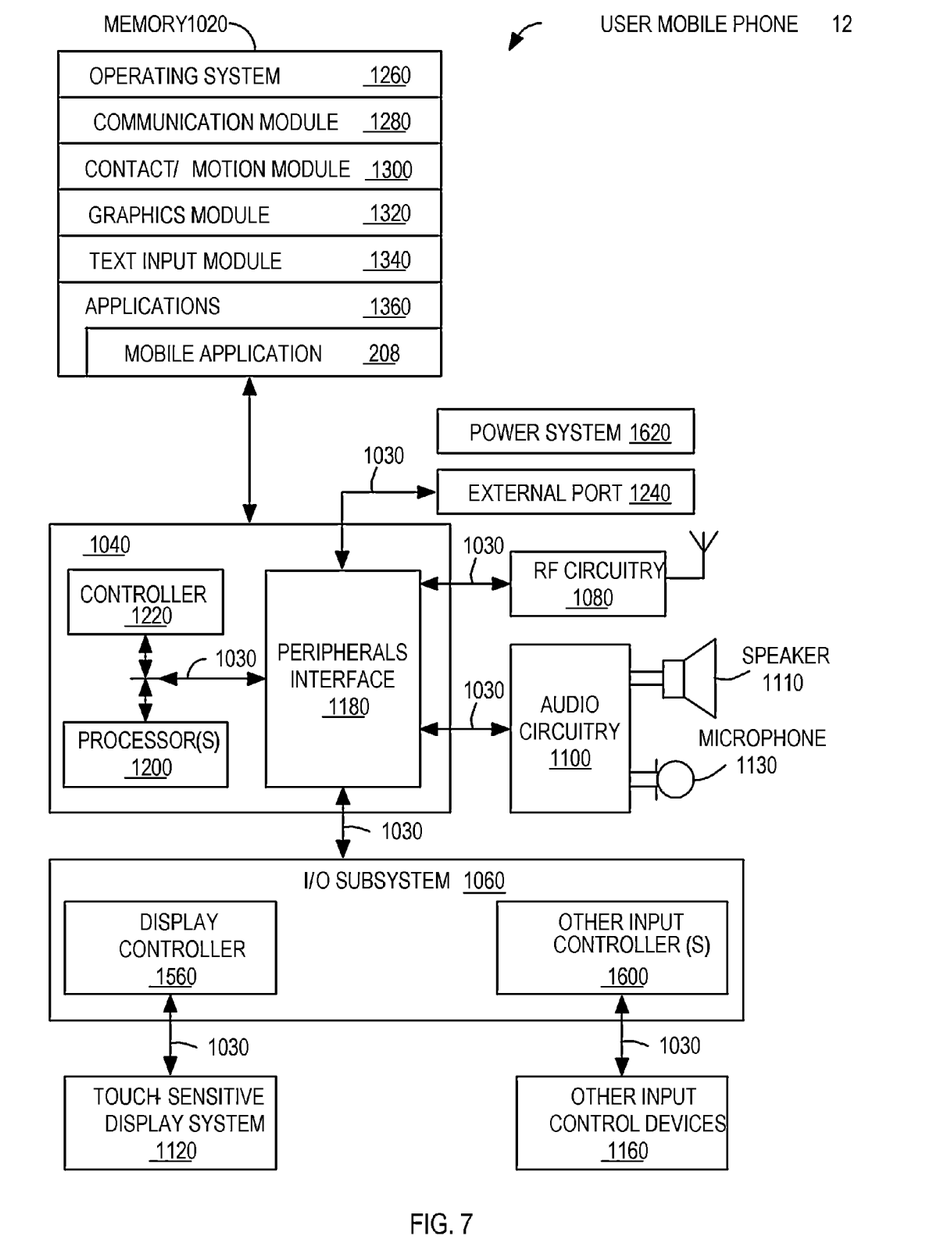
FIG. 7 is a block diagram of the user mobile phone illustrating SmartPhone features thereof.

FIG. 7 is a block diagram illustrating the user mobile phone 12, illustrating a touch-sensitive display 1120 or a "touch screen" for convenience. The user mobile phone 12 includes a memory 1020 (which may include one or more computer readable storage mediums), a memory controller 1220, one or more processing units (CPU's) 1200, a peripherals interface 1180, RF circuitry 1080, audio circuitry 1100, a speaker 1110, a microphone 1130, an input/output (I/O) subsystem 1060, other input or control devices 1160 and an external port 1240. These components communicate over one or more communication buses or signal lines 1030.

The various components shown in FIG. 7 may be implemented in hardware, software or a combination of hardware and software, including one or more signal processing and/or application specific integrated circuits.

The memory 1020 may include high-speed random access memory and may also include non-volatile memory, such as one or more magnetic disk storage devices, flash memory devices, or other non-volatile solid-state memory devices. Access to the memory 1020 by other components of the user mobile phone 12, such as the CPU 1200 and the peripherals interface 1180, is controlled by the memory controller 1220.

The peripherals interface 1180 connects the input and output peripherals of the device to the CPU 1200 and memory 1020. The one or more processors 1200 run or execute various software programs and/or sets of instructions stored in the memory 1020 to perform various functions for the user mobile phone 12 and to process data.

The RF (radio frequency) circuitry 1080 receives and sends RF signals, also called electromagnetic signals. The RF circuitry 1080 converts electrical signals to/from electromagnetic signals and communicates with communications networks and other communications devices via the electromagnetic signals. The RF circuitry 1080 includes well-known circuitry for performing these functions, including an antenna system, an RF transceiver, one or more amplifiers, a tuner, one or more oscillators, a digital signal processor, a CODEC chipset, a subscriber identity module (SIM) card, memory, and so forth. The RF circuitry 1080 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies that are known in the art.

The audio circuitry 1100, the speaker 1110, and the microphone 1130 provide an audio interface between a user and the user mobile phone 12. The audio circuitry 1100 receives audio data from the peripherals interface 1180, converts the audio data to an electrical signal, and transmits the electrical signal to the speaker 1110. The speaker 1110 converts the electrical signal to human-audible sound waves. The audio circuitry 1100 also receives electrical signals converted by the microphone 1130 from sound waves. The audio circuitry 1100 converts the electrical signal to audio data and transmits the audio data to the peripherals interface 1180 for processing. The audio circuitry 1100 also includes a headset jack serving as an interface between the audio circuitry 1100 and removable audio input/output peripherals, such as output-only headphones or a headset with both output (e.g., a headphone for one or both ears) and input (e.g., a microphone).

The I/O subsystem 1060 connects input/output peripherals on the user mobile phone 12, such as the touch screen 1120 and other input/control devices 1160, to the peripherals interface 1180. The I/O subsystem 1060 includes a display controller 1560 and one or more input controllers 1600 for other input or control devices. The one or more input controllers 1600 receive/send electrical signals from/to other input or control devices 1160. The other input/control devices 1160 may include physical buttons (e.g., push buttons, rocker buttons, etc.), dials, slider switches, joysticks, click wheels, and so forth all serving as forming part of an interface. The input controllers 1600 may be connected to any of the following: a keyboard, infrared port, USB port, and a pointer device such as a mouse. The one or more buttons may include an up/down button for volume control of the speaker 1110 and/or the microphone 1130. The one or more buttons may include a push button. A quick press of the push button may disengage a lock of the touch screen 1120 or begin a process that uses gestures on the touch screen to unlock the device. A longer press of the push button may turn power to the user mobile phone 12 on or off. The touch screen 1120 is used to implement virtual or soft buttons and one or more soft keyboards.

The touch-sensitive touch screen 1120 provides an input interface and an output interface between the device and a user. The display controller 1560 receives and/or sends electrical signals from/to the touch screen 1120. The touch screen 1120 displays visual output to the user. The visual output may include graphics, text, icons, video, and any combination thereof (collectively termed "graphics"). In some embodiments, some or all of the visual output may correspond to user-interface objects, further details of which are described below.

A touch screen 1120 has a touch-sensitive surface, sensor or set of sensors that accepts input from the user based on haptic and/or tactile contact. The touch screen 1120 and the display controller 1560 (along with any associated modules and/or sets of instructions in memory 1020) detect contact (and any movement or breaking of the contact) on the touch screen 1120 and converts the detected contact into interaction with user-interface objects (e.g., one or more soft keys, icons, web pages or images) that are displayed on the touch screen. In an exemplary embodiment, a point of contact between a touch screen 1120 and the user corresponds to a finger of the user.

The touch screen 1120 may use LCD (liquid crystal display) technology, or LPD (light emitting polymer display) technology, although other display technologies may be used in other embodiments. The touch screen 1120 and the display controller 1560 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 1120.

The user may make contact with the touch screen 1120 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

The user mobile phone 12 also includes a power system 1620 for powering the various components. The power system 1620 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The software components stored in memory 1020 include an operating system 1260, a communication module (or set of instructions) 1280, a contact/motion module (or set of instructions) 1300, a graphics module (or set of instructions) 1320, a text input module (or set of instructions) 1340, and applications (or set of instructions) 1360.

The operating system 1260 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 1280 facilitates communication with other devices over one or more external ports 1240 and also includes various software components for handling data received by the RF circuitry 1080 and/or the external port 1240. The external port 1240 (e.g., Universal Serial Bus (USB), FIREWIRE, etc.) is adapted for coupling directly to other devices or indirectly over a network (e.g., the Internet, wireless LAN, etc.).

The contact/motion module 1300 may detect contact with the touch screen 1120 (in conjunction with the display controller 1560) and other touch sensitive devices (e.g., a touchpad or physical click wheel). The contact/motion module 1300 includes various software components for performing various operations related to detection of contact, such as determining if contact has occurred, determining if there is movement of the contact and tracking the movement across the touch screen 1120, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). The contact/motion module 1300 and the display controller 1560 also detects contact on a touchpad.

The graphics module 1320 includes various known software components for rendering and displaying graphics on the touch screen 1120, including components for changing the intensity of graphics that are displayed. As used herein, the term "graphics" includes any object that can be displayed to a user, including text, web pages, icons (such as user-interface objects including soft keys), digital images, videos, animations and the like.

The text input module 1340, which may be a component of graphics module 1320, provides soft keyboards for entering text in various applications (e.g., contacts, e-mail, IM, blogging, browser, and any other application that needs text input). The applications 1360 may include the mobile application 208.

Figure 8:
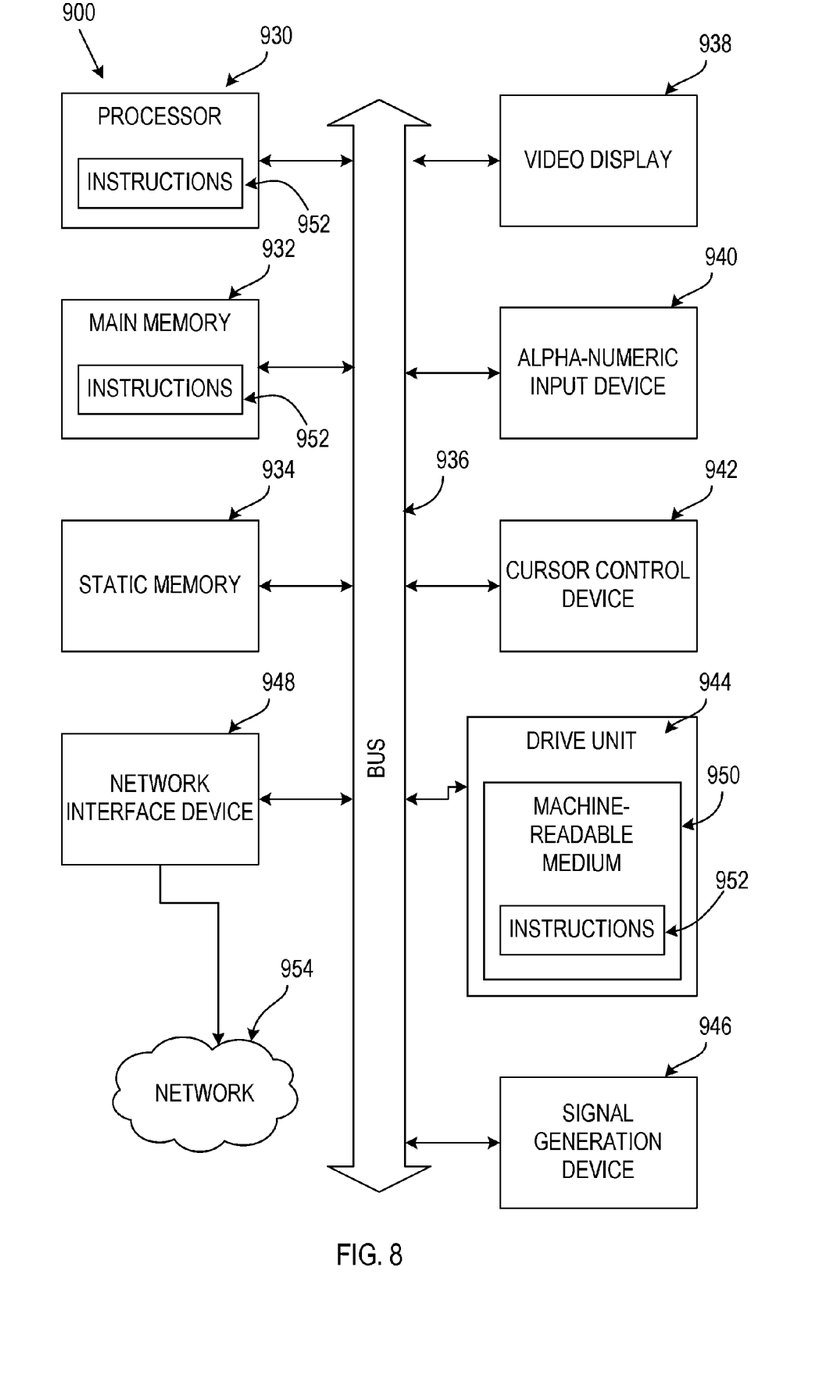
FIG. 8 is a block diagram of a machine in the form of a computer system forming part of the metered parking system.

FIG. 8 shows a diagrammatic representation of a machine in the exemplary form of a computer system 900 within which a set of instructions, for causing the machine to perform any one or more of the methodologies discussed herein, may be executed. In alternative embodiments, the machine operates as a standalone device or may be connected (e.g., networked) to other machines. In a network deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 900 includes a processor 930 (e.g., a central processing unit (CPU), a graphics processing unit (GPU), or both), a main memory 932 (e.g., read-only memory (ROM), flash memory, dynamic random access memory (DRAM) such as synchronous DRAM (SDRAM) or Rambus DRAM (RDRAM), etc.), and a static memory 934 (e.g., flash memory, static random access memory (SRAM, etc.), which communicate with each other via a bus 936.

The computer system 900 may further include a video display 938 (e.g., a liquid crystal displays (LCD) or a cathode ray tube (CRT)). The computer system 900 also includes an alpha-numeric input device 940 (e.g., a keyboard), a cursor control device 942 (e.g., a mouse), a disk drive unit 944, a signal generation device 946 (e.g., a speaker), and a network interface device 948.

The disk drive unit 944 includes a machine-readable medium 950 on which is stored one or more sets of instructions 952 (e.g., software) embodying any one or more of the methodologies or functions described herein. The software may also reside, completely or at least partially, within the main memory 932 and/or within the processor 930 during execution thereof by the computer system 900, the memory 932 and the processor 930 also constituting machine readable media. The software may further be transmitted or received over a network 954 via the network interface device 948.

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

What is claimed:

1. A method of processing a payment for parking with a parking server comprising:

receiving, at the parking server, a parking request message that originated from a user mobile phone having a Mobile Subscriber Integrated Services Digital Network-Number (msisdn), the parking request message including a parking identification;

transmitting, with the parking server, a charge Application Programmable Interface (API) call to a billing server in response to receiving the parking request message, the charge API call including a custom text, an amount to be billed and the msisdn, the billing server, in response to receiving the charge API call, to charge an account at a carrier server corresponding to the msisdn for an amount that is based on the amount in the charge API call and to transmit a parking confirmation text message to the user mobile phone at the msisdn, the parking confirmation text message including the custom text:

receiving, at the parking server, a billing result from the billing server indicating that the account has been charged;

updating, with the parking server, a parking data structure to indicate that parking has been allotted based on the parking identification;

recording, with the parking server, a start time stamp for the allotment of the parking based on the parking identification, the start time stamp being a clock time from a clock indicating when the parking based on the parking identification is allotted;

calculating, with the parking server, an expiration time stamp, the expiration time stamp being the starting time stamp plus a predetermined amount of time; and canceling, with the parking server, the allotment of the parking based on the parking identification when a clock time from a clock reaches a time that is greater than the expiration time stamp.

2. The method of claim 1, wherein the parking request message is a parking request text message that is forwarded by the billing server to the parking server.

3. The method of claim 2, wherein the custom text includes the parking identification.

4. The method of claim 1, wherein the start time stamp is determined in response to receiving the billing result.

5. The method of claim 1, further comprising:

displaying a sign at a location of the user mobile phone, the sign including the parking identification and a number for a short message service (SMS) code processor of the parking server and the parking request message is a parking request text message that is sent to the number of the SMS code processor of the parking server.

6. The method of claim 1, wherein the user mobile phone is at a parking location when sending the parking request message, further comprising:

displaying the allotment and cancellation on a mobile parking unit at a parking location.

7. A non-transitory computer-readable medium having a set of instructions thereon that are executable by a processor of a computer to carry out a method of processing a payment for parking with a parking server comprising:

receiving, at the parking server, a parking request message that originated from a user mobile phone having a Mobile Subscriber Integrated Services Digital Network-Number (msisdn), the parking request message including a parking identification;

transmitting, with the parking server, a charge Application Programmable Interface (API) call to a billing server in response to receiving the parking request message, the charge API call including a custom text, an amount to be billed and the msisdn, the billing server, in response to receiving the charge API call, to charge an account at a carrier server corresponding to the msisdn for an amount that is based on the amount in the charge API call and to transmit a parking confirmation text message to the user mobile phone at the msisdn, the parking confirmation text message including the custom text:

receiving, at the parking server, a billing result from the billing server indicating that the account has been charged;

updating, with the parking server, a parking data structure to indicate that parking has been allotted based on the parking identification;

recording, with the parking server, a start time stamp for the allotment of the parking based on the parking identification, the start time stamp being a clock time from a clock indicating then the parking based on the parking identification is allotted;

calculating, with the parking server, an expiration time stamp, the expiration time stamp being the starting time stamp plus a predetermined amount of time; and canceling, with the parking server, the allotment of the parking based on the parking identification when a clock time from a clock reaches a time that is greater than the expiration time stamp.

8. A metered parking system for processing a payment for parking comprising:
   a parking server including:
      a processor;
      a computer-readable medium connected to the processor;
      a set of instructions on the computer-readable medium, the set of instructions being executable by the processor and including:
         a parking code processor receiving a parking request message from a user mobile phone having a Mobile Subscriber Integrated Services Digital Network-Number (msisdn), the parking request text message including a parking identification;
         a merchant server charge method Application Programmable Interface (API) that transmits a charge API call to a billing server in response to receiving the parking request text message, the charge API call including a custom text, an amount to be billed and the msisdn, the billing server, in response to receiving the charge API call, to charge an account at a carrier server corresponding to the msisdn for an amount that is based on the amount in the charge API call, and the billing server to transmit a parking confirmation text message to the user mobile phone at the msisdn, the parking confirmation text message including the custom text, wherein the merchant server charge method API receives a billing result from the billing server indicating that the account has been charged
         a parking time management module updating a parking data structure to indicate that parking has been allotted based on the parking identification;
   wherein the parking time management module records a start time stamp for the allotment of the parking based on the parking identification, the start time stamp being a clock time from a clock indicating when the parking based on the parking identification is allotted,
   wherein the parking time management module calculates an expiration time stamp, the expiration time stamp being the starting time stamp plus a predetermined amount of time, and
   wherein the parking time management module cancels the allotment of the parking based on the parking identification when a clock time from a clock reaches a time that is greater than the expiration time stamp.

9. The metered parking system of claim 8, wherein the parking request message is a parking request text message that is forwarded by the billing server to the parking server.

10. The metered parking system of claim 9, wherein the custom text includes the parking identification.

11. The metered parking system of claim 8, wherein the start time stamp is determined in response to receiving the billing result.

12. The metered parking system of claim 8, further comprising:
   a sign at a location of the user mobile phone, the sign including the parking identification and a number for a short message service (SMS) code processor of the parking server and the parking request message is a parking request text message that is sent to the number of the SMS code processor of the parking server.

13. The metered parking system of claim 8, wherein the user mobile phone is at a parking location when sending the parking request message, further comprising:
   a mobile parking unit at a parking location displaying the allotment and cancellation of the parking based on the parking identifier.

\* \* \* \* \*